US011487566B2

(12) United States Patent
Prziborowski et al.

(10) Patent No.: US 11,487,566 B2
(45) Date of Patent: Nov. 1, 2022

(54) CROSS-CLOUD PROVIDER VIRTUAL MACHINE MIGRATION

(71) Applicant: VMware, Inc., Palo Alto, CA (US)

(72) Inventors: Nathan L. Prziborowski, Sonoma, CA (US); Gabriel Tarasuk-Levin, San Jose, CA (US); Arunachalam Ramanathan, San Jose, CA (US); Prachetaa Raghavan, Sunnyvale, CA (US); Benjamin Yun Liang, San Jose, CA (US); Haripriya Rajagopal, San Jose, CA (US); Longhao Shu, Portland, OR (US)

(73) Assignee: VMWARE, INC., Palo Alto, CA (US)

( * ) Notice: Subject to any disclaimer, the term of this patent is extended or adjusted under 35 U.S.C. 154(b) by 763 days.

(21) Appl. No.: 15/195,680

(22) Filed: Jun. 28, 2016

(65) Prior Publication Data

US 2017/0371696 A1 Dec. 28, 2017

(51) Int. Cl.
*G06F 9/455* (2018.01)

(52) U.S. Cl.
CPC .. *G06F 9/45558* (2013.01); *G06F 2009/4557* (2013.01); *G06F 2009/45595* (2013.01)

(58) Field of Classification Search
CPC ......... G06F 9/45558; G06F 2009/4557; G06F 2009/45595
USPC ........................................................... 718/1
See application file for complete search history.

(56) References Cited

U.S. PATENT DOCUMENTS

| 8,285,817 B1* | 10/2012 | Balasubramanian ......................... G06F 17/30079 709/219 |
| 2010/0306381 A1* | 12/2010 | Lublin .................... G06F 15/16 709/226 |
| 2011/0131569 A1* | 6/2011 | Heim ................... G06F 9/45558 718/1 |
| 2011/0179415 A1* | 7/2011 | Donnellan .......... G06F 9/45558 718/1 |

(Continued)

OTHER PUBLICATIONS

Hansen et al. "Self-migration of Operating Systems", 2004, Proceedings of the 11th workshop on ACM SIGOPS European workshop. ACM (Year: 2004).*

(Continued)

*Primary Examiner* — Meng Ai T An
*Assistant Examiner* — Willy W Huaracha
(74) *Attorney, Agent, or Firm* — Patterson & Sheridan, LLP

(57) ABSTRACT

A method for migrating a virtual machine (VM) includes establishing a first connection to a first cloud computing system executing a first VM, and establishing a second connection to a second cloud computing system managed by a second cloud provider, which is different form the first cloud provider. The method further includes instantiating a second VM designated as a destination VM in the second cloud computing system, and installing a migration agent on each of the first VM and the second VM. The migration agents execute a migration process of the first VM to the second VM by (1) iteratively copying guest data from the first VM to the second VM until a switchover criteria of the migration operation is met, and (2) copying a remainder of guest data from the first VM to the second VM when the switchover criteria is met.

18 Claims, 2 Drawing Sheets

(56) References Cited

U.S. PATENT DOCUMENTS

| | | | | |
|---|---|---|---|---|
| 2012/0054367 | A1* | 3/2012 | Ramakrishnan | G06F 9/4856 709/242 |
| 2012/0239790 | A1* | 9/2012 | Doane | H04L 63/10 709/220 |
| 2012/0254866 | A1* | 10/2012 | Iwamatsu | G06F 9/45558 718/1 |
| 2012/0311568 | A1* | 12/2012 | Jansen | G06F 9/45558 718/1 |
| 2013/0166504 | A1* | 6/2013 | Varkhedi | G06F 9/4856 707/610 |
| 2014/0298338 | A1* | 10/2014 | Doi | G06F 9/4856 718/1 |
| 2016/0266919 | A1* | 9/2016 | Wang | G06F 9/45558 |
| 2017/0026355 | A1* | 1/2017 | Mathaiyan | H04L 63/08 |
| 2017/0060628 | A1* | 3/2017 | Tarasuk-Levin | G06F 9/4856 |

OTHER PUBLICATIONS

Hansen, Jacob Gorm. "Virtual machine mobility with self-migration". Diss. Ph. D. thesis, Department of Computer Science, University of Copenhagen, pp. 1-147. (Year: 2009).*

Clark et al. "Live migration of virtual machines" May 2005, In Proceedings of the 2nd conference on Symposium on Networked Systems Design & Implementation—vol. 2, USENIX Association, pp. 273-286. (Year: 2005).*

* cited by examiner

CROSS-CLOUD PROVIDER VIRTUAL MACHINE MIGRATION

BACKGROUND

Cloud architectures are used in cloud computing and cloud storage systems for offering infrastructure-as-a-service (IaaS) cloud services. Examples of cloud architectures include the VMware vCloud Director® cloud architecture software, Amazon EC2™ web service, and OpenStack™ open source cloud computing service. IaaS cloud service is a type of cloud service that provides access to physical and/or virtual resources in a cloud environment. These services provide a tenant application programming interface (API) that supports operations for manipulating IaaS constructs, such as virtual machines (VMs) and logical networks.

One hurdle for customer adaption of cloud services has been the task of moving the customer's existing workloads. This is a problem exacerbated by the diversity of cloud service providers today, in which capturing a customer's business might involve exporting running VMs from multiple cloud service providers. This problem limits customer mobility between providers and incurs high costs in downtime and bandwidth. While some conventional approaches might provide a vendor-specific migration tool, such approaches rely on the specific internal architecture of the particular cloud provider, and lock customers into a specific cloud provider with no real mobility. Another conventional approach is a "cold" migration, which imports a virtual machine contained in a packaged format (for example, Open Virtualization Format, or OVF). However, packaged import requires a VM to be off during the duration of the export and copy, which imposes a high cost in lost productivity and significant administrative overhead to export the OVF and ensure that the migration destination cloud provider supports all the features and functionality of the exported VM.

SUMMARY

Embodiments of the present disclosure provide a computing system, a computer readable storage medium having computer-executable program code, and a method for migrating a virtual machine. The method includes establishing a first connection, as a first tenant, to a first cloud computing system executing a first virtual machine (VM) associated with the first tenant, and establishing a second connection, as the first tenant, to a second cloud computing system managed by a second cloud provider. The first cloud computing system is managed by a first cloud provider; and the first cloud provider and the second cloud provider are different. The method further includes instantiating a second VM designated as a destination VM in the second cloud computing system, and installing a guest-level migration agent on each of the first VM and the second VM, wherein the guest-level migration agents are configured to execute within a virtual machine at a guest level. The guest-level migration agents are configured to execute a migration process of the first VM in the first cloud computing system to the second VM in the second cloud computing system by (1) iteratively copying guest data from the first VM to the second VM until a switchover criteria of the migration operation is met, and (2) copying a remainder of guest data from the first VM to the second VM responsive to satisfaction of the switchover criteria.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments of present disclosure provide VM migration across cloud providers, enabling customers to move VMs based on workloads and cost constraints in the public cloud, with very low downtime. One embodiment of the present disclosure provides a cross-cloud migration service is described which runs outside of both cloud providers (i.e., source and destination) and a guest-level program for the source and destination virtual machine that runs on the guest VM. When the migration operation is initiated via the cross-cloud migration service, the source migration program forwards the current disk state to the destination VM, which writes the data directly to its disks. This progresses until the source and destination virtual disks converge, at which point the source is shut down and final checkpoint state is sent across, followed by the destination machine being rebooted, and then made accessible. In such a fashion, the user is able to continue working until such a time that the destination is ready, reducing the time spent waiting on disk copy and virtual machine export. Accordingly, the described embodiments advantageously help customers to move across any public cloud provider without being locked into a single cloud provider.

Figure 1:
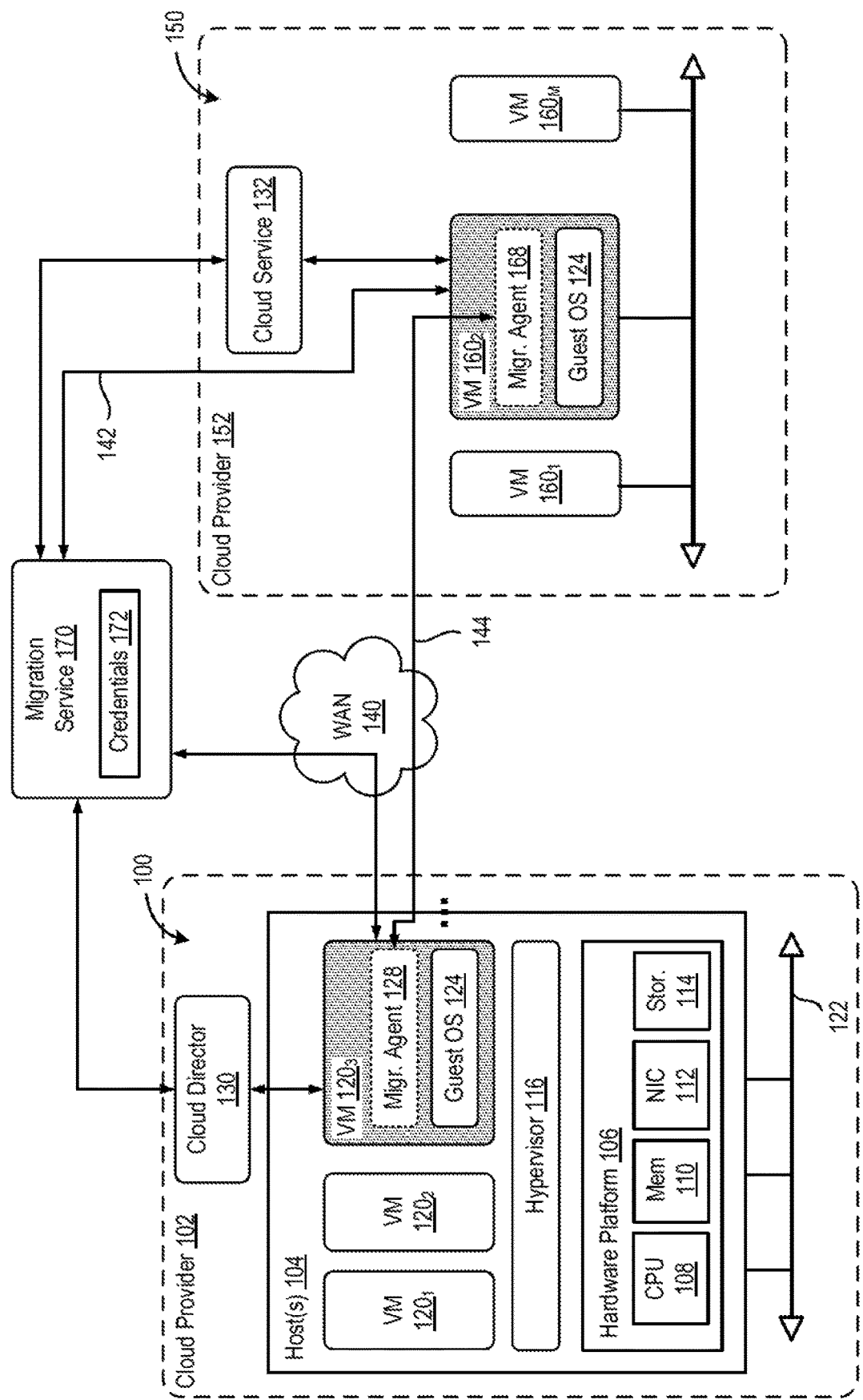
FIG. 1 is a block diagram of a cloud computing environment in which one or more embodiments of the present disclosure may be utilized.

FIG. 1 is a block diagram of a cloud computing environment in which one or more embodiments of the present disclosure may be utilized. The depicted cloud computing environment includes a first cloud computing system 100, a second cloud computing system 150, and a migration service 170. In one embodiment, cloud computing system 100 may include one or more data centers controlled and administrated by a first cloud provider 102, and may be exposed as a service publicly available to account holders, also referred to as users or tenants. Similarly, second cloud computing system 150 may include one or more data centers controlled and administrated by a second cloud computing service provider (e.g., cloud provider 152), and may be exposed as a service publicly available to account holders. In the present disclosure, a VM migration is described from cloud computing system 100 (which may be interchangeably referred to as the "source") to cloud computing system 150 (which may be interchangeably referred to as the "destination"), although it is understood that a VM migration may similarly occur in the opposite direction. Furthermore, it is understood that a VM migration may occur from cloud computing system 100 to multiple, different cloud providers. As used herein, an internal cloud or "private" cloud is a cloud in which a tenant and a cloud service provider are part of the same organization, while an external or "public" cloud is a cloud that is provided by an organization that is separate from a tenant that accesses the external cloud. For example, the tenant may be part of an enterprise, and the external cloud may be part of a cloud service provider that is separate from the enterprise of the tenant and that provides cloud services to different enterprises and/or individuals. As such, cloud computing systems 100, 150 may be referred to as "public" clouds.

Cloud computing system 100 includes one or more host computer systems ("hosts 104"). Hosts 104 may be constructed on a server grade hardware platform 106, such as an x86 architecture platform. As shown, hardware platform 106 of each host 104 may include conventional components of a computing device, such as one or more processors (CPUs) 108, system memory 110, a network interface 112, storage system 114, and other I/O devices such as, for example, a mouse and keyboard (not shown). CPU 108 is configured to execute instructions, for example, executable instructions that perform one or more operations described herein and may be stored in memory 110 and in local storage. Memory 110 is a device allowing information, such as executable instructions, cryptographic keys, virtual disks, configurations, and other data, to be stored and retrieved. Memory 110 may include, for example, one or more random access memory (RAM) modules. Network interface 112 enables host 104 to communicate with another device via a communication medium, such as a network 122 within cloud computing system 100. Network interface 112 may be one or more network adapters, also referred to as a Network Interface Card (NIC). Storage system 114 represents local storage devices (e.g., one or more hard disks, flash memory modules, solid state disks, and optical disks) and/or a storage interface that enables host 104 to communicate with one or more network data storage systems. Examples of a storage interface are a host bus adapter (HBA) that couples host 104 to one or more storage arrays, such as a storage area network (SAN) or a network-attached storage (NAS), as well as other network data storage systems. It is recognized that hardware resources of cloud computing system 100 may in fact be distributed across multiple data centers in different locations.

Each host 104 is configured to provide a virtualization layer that abstracts processor, memory, storage, and networking resources of hardware platform 106 into multiple virtual machines $120_1$ to $120_N$ (collectively referred to as VMs 120) that run concurrently on the same hosts. VMs 120 run on top of a software interface layer, referred to herein as a hypervisor 116, that enables sharing of the hardware resources of host 104 by VMs 120. One example of hypervisor 116 that may be used in an embodiment described herein is a VMware ESXi™ hypervisor provided as part of the VMware vSphere® solution made commercially available from VMware, Inc. of Palo Alto, Calif. Hypervisor 116 may run on top of the operating system of host 104 or directly on hardware components of host 104. Each VM 120 may have a guest operating system (e.g., guest OS) 124 and one or more applications executing there within.

In one embodiment, cloud computing system 100 includes a cloud director 130 (e.g., run in one or more virtual machines) that manages allocation of virtual computing resources to an enterprise for deploying applications. Cloud director 130 may be accessible to users via a REST (Representational State Transfer) API (Application Programming Interface) or any other client-server communication protocol. Cloud director 130 may authenticate connection attempts from a user using credentials issued by the cloud computing provider. Cloud director 130 can maintain and publish a catalog of available virtual machine templates and packaged virtual machine applications that represent virtual machines that may be provisioned in a cloud computing environment. A virtual machine template is a virtual machine image that is loaded with a pre-installed guest operating system, applications, and data, and is typically used to repeatedly create a VM having the pre-defined configuration. Cloud director 130 receives provisioning requests submitted (e.g., via REST API calls) and may propagates such requests to an orchestration component to instantiate the requested virtual machines (e.g., VMs 120). One example of cloud director 130 is the VMware vCloud Director® produced by VMware, Inc. Cloud director 130 may include a virtualization management component that may communicate to the plurality of hosts 104 via a network. The virtualization manager is configured to carry out administrative tasks for computing system 100, including managing hosts 104, managing VMs 120 running within each host 104, provisioning VMs, migrating VMs from one host to another host, and load balancing between hosts 104.

Similar to cloud computing system 100, cloud computing system 150 is configured to dynamically provide an enterprise (or users of an enterprise) with one or more virtual data centers in which a user may provision VMs 160, deploy multi-tier applications on VMs 160, and/or execute workloads. For simplicity of explanation and illustration, one or more of the infrastructure platform and virtualization environment of cloud computing system 150 have been omitted, but it is understood cloud computing system 150 may have similar elements as computing system 100 described earlier, e.g., having computing resources (e.g., hosts), storage resources (e.g., one or more storage array systems), and networking resources, which are configured in a manner to provide a virtualization environment that supports the execution of a plurality of virtual machines 160. In one embodiment, cloud computing system 150 includes a cloud service 132 that manages allocation of virtual computing resources to a tenant. Cloud service 132 may be accessible to users via a REST API, and may authenticate connection attempts from a user using credentials issued by the cloud computing provider.

Embodiments of the present disclosure provide techniques for VM migration from cloud computing system 100 to cloud computing system 150. In one example, cloud computing system is the migration source and cloud computing system 150 is the migration destination. Alternatively, cloud computing system 150 can be the migration source and cloud computing system 100 can be the migration destination. For purposes of clarity by example, embodiments of cross-cloud provider VM migration are described below with respect to a source VM $120_3$ in cloud computing system 100 being the migration source and a destination VM $160_2$ in the cloud computing system 150 being the migration destination, in which an organization is a tenant in both cloud computing systems. It is to be understood that the migration can be reversed using the same techniques.

In one or more embodiments, migration service 170 is configured to facilitate a cross-cloud provider VM migration between cloud computing systems. In contrast to "cold migration" in which the source VM is powered off during migration, embodiments enable a migration in which the VM is powered on during migration. In one embodiment, migration service 170 is executing (e.g., as a VM, or on a physical host) external to both cloud computing systems 100, 150 which are subjects of the VM migration process. Embodiments of the present disclosure minimize virtual machine downtime while still remaining provider agnostic.

By leveraging a scheme of iterative pre-copying, downtime can be drastically reduced by leaving the virtual machine running until switchover is possible. Cloud provider independence is provided by performing the migration from within the guest OS on the virtual machine itself, without interrupting the guest's current operations, ensuring that the migration has a consistent picture of the data being copied.

In one embodiment, migration service 170 is responsible for orchestrating the VM migration from the source cloud provider to the destination cloud provider. Migration service 170 may store or maintain one or more credentials 172 for connecting to each cloud providers 102, 152, such as a username, password, private key, etc. As described in greater detail below, migration service 170 is configured to connect to each of the cloud providers, create a destination VM, ensure that both source and destination VMs are able to communicate with each other, request authorization from the user to migrate and shut down the source VM, estimate a data transfer time, installing a migration program (e.g., migration agent 128, 168) on both source and destination VMs, instantiate a copy of data to the destination VM, and reboot the destination VM once the data has been copied over. Migration service 170 is configured to copy and install a migration agent 128, 168 on a source VM and destination VM, respectively.

In one embodiment, migration agents 128, 168 are responsible for copying over data from the source VM to the destination VM. The migration agent is also responsible for slowing down the source VM's I/O operations so that the data transfer converges. The migration agents are further responsible for copying over the delta by intercepting the shutdown routing of the source VM. In one example operation, a user simply has to execute migration service 170, which will take care of authenticating with the source and destination VMs (e.g., when provided with a username and private key).

Figure 2:
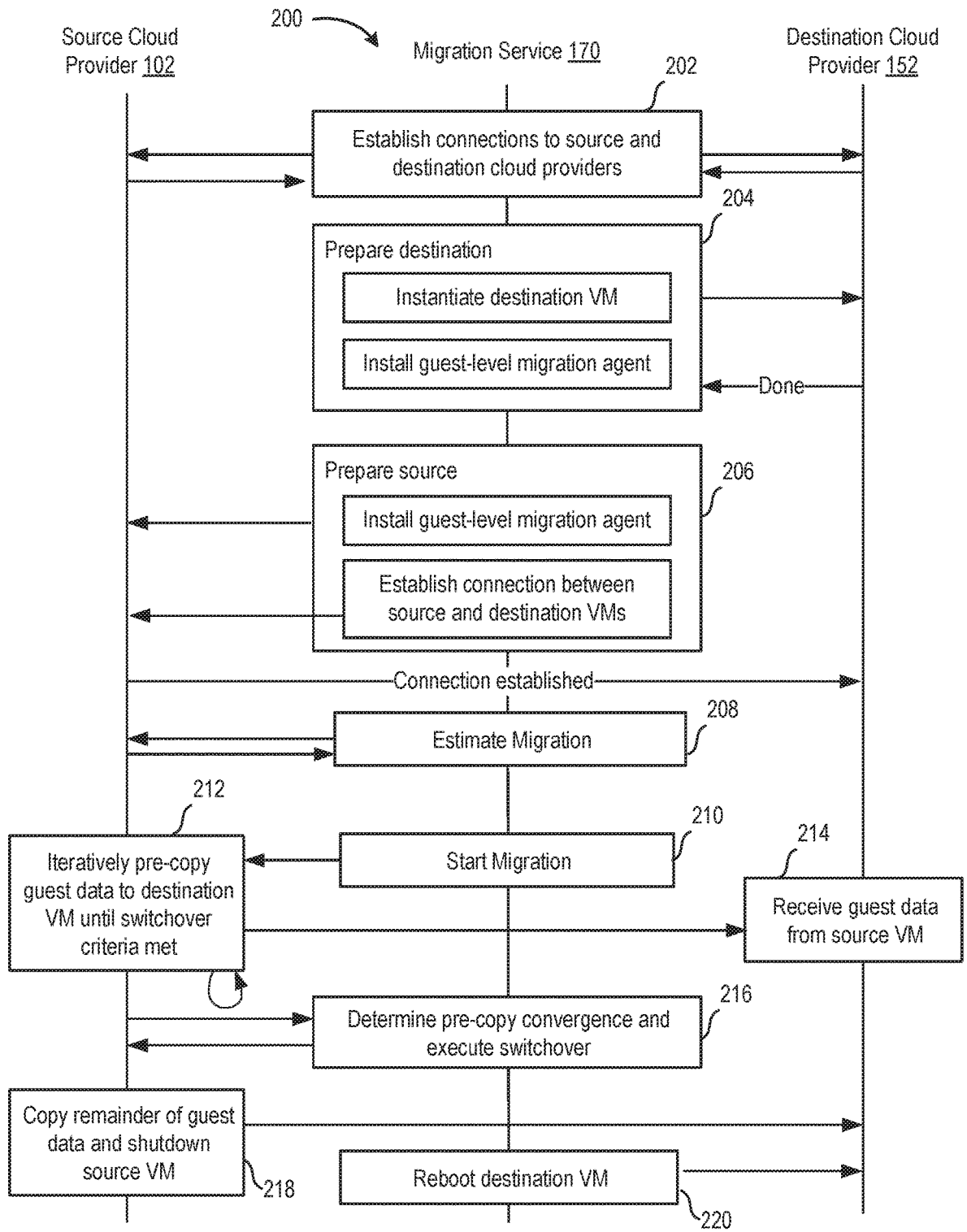
FIG. 2 is a flow diagram depicting a method for migrating a virtualized computing instance, such as a VM, between source and destination virtualized computing systems, such as between cloud computing system and cloud computing system, according to one embodiment.

FIG. 2 is a flow diagram depicting a method 200 for migrating a virtualized computing instance, such as a VM, between source and destination virtualized computing systems, such as between cloud computing system 100 and cloud computing system 150.

Method 200 may begin at step 202, migration service 170 establishes connections to both source cloud provider 102 and destination cloud provider 152, using credentials 172 stored at the service or provided by a user in real time. At steps 204 and 206, migration service 170 prepares the source cloud provider 102 and the destination cloud provider 152. In some embodiments, migration service 170 prepares the destination cloud provider 152 by directing the destination cloud provider 152 to instantiate a destination VM 160 and installing a migration agent 168 on the destination VM. If one of the cloud providers does not expose a public network address (e.g., IP address) to the subject VM, migration service can establish a virtual private network (VPN) connection (e.g., connection 142) to the cloud provider 152, and then install migration agent 168 on that VM from where the agent can run and perform the described actions. Otherwise, migration service 170 can directly install a migration agent 128, 168 onto source and destination VMs, respectively, via a public IP of the respective VMs. If both VMs have private IP addresses, then migration service 170 may act as a proxy to proxy the data across two VPNs established by migration service 170.

In some embodiments, migration service 170 instantiates a destination VM from a template of destination cloud provider 152 based on a compatibility with the target source VM. For example, migration service 170 may specify a same operating system version on the destination cloud. Other compatibility VM configurations include various information and settings for VM 120, such as the number of allocated virtual CPUs, the amount of allocated virtual memory, the amount of allocated virtual storage, datastore location(s), network information, virtual hardware information, and the like. Once migration service 170 deploys a destination VM from a template, migration service 170 boots up the destination VM, and a user can provide migration service 170 with a required IP and credentials (e.g., private key) of the destination VM. Once destination VM (and migration agent 168) has been set up, migration agent 168 waits for data to arrive from the source VM. The wait for data may have a timeout period beyond which, if migration agent 168 receives no data, the destination VM may shut down.

In some embodiments, migration service 170 establishes a connection directly between source and destination VMs. If the cross-cloud migration service has the required IP and credentials of the destination VM, migration service 170 uses the private key and the username to connect to the destination VM. The migration service may then invoke or run the migration agent 168 remotely on the destination VM to ensure there is connection between the source and destination VM. If one of the sides has a private IP address, then migration service 170 may run locally on that VM.

At step 208, migration service 170 estimates the migration time to transfer the data to the destination VM and requests authorization from the user to proceed with the migration from the source VM. In one example implementation, migration service 170 may invoke a command similar to "rsync -avvni" command to estimate the data size and bandwidth for the migration. Migration service 170 can estimate the migration time based on the statistics returned from the invoked command and further based on the I/O frequency of the source VM, and update the user about the time required for completion. Once the user authorizes the migration, cross-cloud migration service 170 can proceed to step 210.

At step 210, migration service 170 starts the cross-cloud provider VM migration. In some embodiments, migration service 170 determines the switchover criteria, such as the amount of downtime of the source VM, as provided by a user or using a default value (e.g., 5 minutes). Migration service 170 directs the migration agent 128 to start copying files and guest data from the source VM to the destination VM.

At step 212, migration agent 128 executing on the source VM iteratively copies guest data from the source VM to the destination VM until the switchover criteria of the migration operation is met. At step 214, migration 168 executing on the destination VM receives the guest data and writes the guest data directly to the disk of the destination VM while operating at a guest level (in contrast to a host-level process that operates outside of the VM).

An example algorithm is provided below in pseudo-code. In the example algorithm, a downtime parameter is specified (e.g., 5 minutes) or can be a user-specified argument. The do-while loop performs copy iterations until the downtime condition is met. The first invoked command copies all data under root (i.e., "/"). In some embodiments, one or more directories of guest data can be excluded from the transfer. The second invoked command estimates the time to migrate, going over the same data under root (i.e., "/") and determine the delta to be copied. The do-while loop continues so long as the estimated time to migrate exceeds the specified downtime parameter.

TABLE 1

Pseudocode

```
downtime = 300
do {
    transferRate = rsync -avz -e "ssh -i privateKey" /
        user@destMachine
    deltaToMigrate = rsync -avvni -e "ssh -I privateKey" /
        user@destMachine
    timetoMigrate = deltaToMigrate * transferRate
} while (timetoMigrate > downtime)
```

In some cases, pre-copy convergence may not occur without assistance from migration agent 128. In such embodiments, migration agent 128 hooks into a kernel I/O path and slows down I/O operations such that the source VM's dirty rate is less than the network copy rate. In one example kernel probes technology, embodiments may use a probes handler that assumes the same prototype as the function, i.e., it is invoked with the same argument list as the probed function. When the probe is hit, the probe makes a copy of the saved registers and a generous portion of the stack. The probe then points the saved instruction pointer at the probe's handler routine, and returns from the trap. As a result, control passes to the handler, which is presented with the same register and stack contents as the probed function. When it is done, the handler calls a probe_return( ), which traps again to restore the original stack contents and processor state and switch to the probed function.

As such, once the migration agent 128 has control, every I/O goes through the new function, which can then be used to slow down the I/O path. For example, migration agent 128 can intercept at the Virtual File system (VFS, say for linux-based machines) or the generic block layer and therefore, are in the direct I/O path. Migration agent 128 can delay queuing up on the I/O which in return results in slowing down the application writes in tune with the migration transmit rate. Once migration agent 128 has slowed down the I/O, convergence can be achieved after some point in time which will depend on the switchover criteria as mentioned above.

In some embodiments, at some point where it is determined that pre-copy convergence has reached the switchover criteria (step 216), migration service 170 stops all programs and services on the service VM to maintain consistency while copying the remaining delta across (e.g., step 218). Hence, once the convergence has been reached, migration agent 128 may restrict run level operations of the source VM. In one implementation, migration agent 128 switches to a single user mode, remounts the filesystem as read-only to prevent any reads to the filesystem and then proceeds to step 218 to copy over the remaining delta.

At step 218, migration agent 128 executing on the source VM copies a remainder of guest data from the first VM to the second VM responsive to satisfaction of the switchover criteria. Once the delta has been copied across, migration agent 128 sends an ALL_DATA_SENT message to the destination VM to signal completion of data transfer. At this point, the source VM is ready to be shut down. At step 220, once an ALL_DATA_SENT message has been received, the destination VM is rebooted and starts executing from the new files.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method for migrating a virtual machine, the method comprising:
    establishing a first connection, as a first tenant, to a first cloud computing system executing a first virtual machine (VM) associated with the first tenant, wherein the first cloud computing system is managed by a first cloud provider;
    establishing a second connection, as the first tenant, to a second cloud computing system managed by a second cloud provider, wherein the first cloud provider and the second cloud provider are different, and wherein the first connection and the second connection are established by a migration service outside of both the first cloud computing system and the second cloud computing system;
    instantiating a second VM designated as a destination VM in the second cloud computing system;
    responsive to determining that the second cloud computing system does not expose a public network address to the second VM, generating a virtual private network (VPN) connection to the second VM;
    installing a respective guest-level VM migration agent on each of the first VM and the second VM, wherein the guest-level VM migration agents are each configured to execute within the first VM and the second VM at a guest level, wherein the guest level VM migration agents are separate from a respective guest operating system (OS) configured to execute within the first VM and the second VM, and wherein the respective guest-level VM migration agent of the second VM is installed via the VPN connection; and
    executing a VM migration process which moves the first VM in the first cloud computing system to the second cloud computing system as the second VM using the guest-level VM migration agents by (1) iteratively copying guest data from the first VM to the second VM until one or more switchover criteria of the VM migration process are met, and (2) copying a remainder of guest data from the first VM to the second VM responsive to satisfaction of the one or more switchover criteria.

2. The method of claim 1, wherein the VM migration process is completed by rebooting the second VM.

3. The method of claim 1, wherein, during the VM migration process, the respective guest-level VM migration agent of the first VM determines an estimated time for transferring the guest data from the first VM to the second VM.

4. The method of claim 3, wherein the one or more switchover criteria comprise a downtime parameter indicating a duration of time, and step (2) is executed when the downtime parameter no longer exceeds the estimated time for transferring the guest data.

5. The method of claim 1, wherein, during the VM migration process, the respective guest-level VM migration agent of the first VM excludes one or more directories from transfer of the guest data.

6. The method of claim 1, wherein, during the VM migration process, the respective guest-level VM migration agent of the first VM, responsive to determining that the one or more switchover criteria have been satisfied, restricts run-level access by the first VM to the guest data.

7. A non-transitory computer readable medium comprising instructions that are executable in a computer system to carry out a method for migrating a virtual machine, the method comprising:
    establishing a first connection, as a first tenant, to a first cloud computing system executing a first virtual machine (VM) associated with the first tenant, wherein the first cloud computing system is managed by a first cloud provider;
    establishing a second connection, as the first tenant, to a second cloud computing system managed by a second cloud provider, wherein the first cloud provider and the second cloud provider are different, and wherein the first connection and the second connection are established by a migration service outside of both the first cloud computing system and the second cloud computing system;
    instantiating a second VM designated as a destination VM in the second cloud computing system;
    responsive to determining that the second cloud computing system does not expose a public network address to the second VM, generating a virtual private network (VPN) connection to the second VM;

installing a respective guest-level VM migration agent on each of the first VM and the second VM, wherein the guest-level VM migration agents are each configured to execute within the first VM and the second VM at a guest level, wherein the guest level VM migration agents are separate from a respective guest operating system (OS) configured to execute within the first VM and the second VM, and wherein the respective guest-level VM migration agent of the second VM is installed via the VPN connection; and executing a VM migration process which moves the first VM in the first cloud computing system to the second cloud computing system as the second VM using the guest-level VM migration agents by (1) iteratively copying guest data from the first VM to the second VM until one or more switchover criteria of the VM migration process are met, and (2) copying a remainder of guest data from the first VM to the second VM responsive to satisfaction of the one or more switchover criteria.

8. The non-transitory computer readable medium of claim 7, wherein the VM migration process is completed by rebooting the second VM.

9. The non-transitory computer readable medium of claim 7, wherein during the VM migration process, the respective guest-level VM migration agent of the first VM determines an estimated time for transferring the guest data from the first VM to the second VM.

10. The non-transitory computer readable medium of claim 9, wherein the one or more switchover criteria comprise a downtime parameter indicating a duration of time, and step (2) is executed when the downtime parameter no longer exceeds the estimated time for transferring the guest data.

11. The non-transitory computer readable medium of claim 7, wherein during the VM migration process, the respective guest-level VM migration agent of the first VM excludes one or more directories from transfer of the guest data.

12. The non-transitory computer readable medium of claim 7, wherein, during the VM migration process, the respective guest-level VM migration agent of the first VM, responsive to determining that the one or more switchover criteria have been satisfied, restricts run-level access by the first VM to the guest data.

13. A computer system comprising:
a first cloud computing system including a first host computer executing a first virtual machine (VM), the first VM having installed therein a guest-level VM migration agent, wherein the first cloud computing system is managed by a first cloud provider; and
a second cloud computing system including a second host computer, wherein the second cloud computing system is managed by a second cloud provider that is different from the first cloud provider;
a migration service outside of both the first cloud computing system and the second cloud computing system, wherein the migration service is configured to establish a first connection as a first tenant to the first cloud computing system, and establish a second connection as the first tenant to the second cloud computing system,
wherein the second host computer is configured to instantiate a second VM designated as a destination VM,
wherein the migration service is configured to, responsive to determining that the second cloud computing system does not expose a public network address to the second VM, generate a virtual private network (VPN) connection to the second VM, wherein a guest-level VM migration agent of the second VM is installed via the VPN connection, and
wherein the guest level VM migration agents are separate from a respective guest operating system (OS) configured to execute within the first VM and the second VM, and wherein the guest-level VM migration agents of the first VM and the second VM are configured to execute a VM migration process which moves the first VM to the second cloud computing system as the second VM by (1) iteratively copying guest data from the first VM to the second VM until one or more switchover criteria of the VM migration process are met, and (2) copying a remainder of guest data from the first VM to the second VM responsive to satisfaction of the one or more switchover criteria.

14. The computer system of claim 13, wherein the VM migration process is completed by rebooting the second VM.

15. The computer system of claim 13, wherein the VM guest-level migration agent of the first VM is configured to determine an estimated time for transferring the guest data from the first VM to the second VM.

16. The computer system of claim 15, wherein the one or more switchover criteria comprise a downtime parameter indicating a duration of time, and the guest-level VM migration agents are configured to iteratively copy the guest data so long as the downtime parameter exceeds the estimated time for transferring the guest data.

17. The computer system of claim 13, wherein the guest-level VM migration agent of the first VM is further configured to exclude one or more directories from transfer of the guest data.

18. The computer system of claim 13, wherein the guest-level VM migration agent of the first VM is further configured to:
responsive to determining that the one or more switchover criteria have been satisfied, restrict run-level access by the first VM to the guest data.

* * * * *